United States Patent [19]

Twigg

[11] Patent Number: 4,568,583
[45] Date of Patent: Feb. 4, 1986

[54] STEAM REFORMING

[75] Inventor: Martyn V. Twigg, Cleveland, England

[73] Assignee: Imperial Chemical Industries PLC, Great Britain

[21] Appl. No.: 615,275

[22] Filed: May 30, 1984

[30] Foreign Application Priority Data

Jun. 17, 1983 [GB] United Kingdom ............... 8316588

[51] Int. Cl.$^4$ .......................... C01B 3/40; B01J 35/04
[52] U.S. Cl. ................................. 428/35; 48/214 A; 422/222; 252/373
[58] Field of Search ............... 48/214 A; 252/373; 428/36, 35; 422/222

[56] References Cited

U.S. PATENT DOCUMENTS

| 3,477,833 | 11/1969 | McMullin et al. ............... 48/214 A |
| 4,083,799 | 4/1978 | Estes et al. ...................... 252/373 |
| 4,197,217 | 4/1980 | Gartshore et al. ............... 252/373 |
| 4,340,501 | 7/1982 | Davidson ........................... 252/373 |
| 4,400,309 | 8/1983 | McMahon et al. ................ 423/403 |

FOREIGN PATENT DOCUMENTS

| 21736 | 1/1981 | European Pat. Off. . |
| 82614 | 6/1983 | European Pat. Off. . |
| 2103953 | 3/1983 | United Kingdom ............... 252/373 |

Primary Examiner—John E. Kittle
Assistant Examiner—James J. Seidleck
Attorney, Agent, or Firm—Cushman, Darby & Cushman

[57] ABSTRACT

A shaped solid material to be contacted with a flowing fluid, in the form of tubular units each having a perforated wall and having means to distance that wall from the wall of a container in which they are to be stacked in axial relationship with one another and with the container. The shaped solid material is especially useful as a hydrocarbon steam reforming catalyst, in which event it is made of metal or highly calcined ceramic and carries a coating of for example nickel and alumina.

15 Claims, 5 Drawing Figures

STEAM REFORMING

DESCRIPTION OF THE INVENTION

This invention relates to a contact material, especially for catalytic processes involving substantial heat effects.

In processes involving contact between a flowing fluid and a stationary solid it is often considered desirable to maximise the geometric surface of the solid, but it is not easy to achieve this without increasing resistance to the flow of the fluid. In our co-pending U.S. application Ser. No. 447,134 we disclose that one such process, namely catalytic hydrocarbon steam reforming, can be carried out using a catalyst having substantially less geometric surface than was previously considered desirable. The present invention relates to a contact material in a form especially suitable for such a process and also others having like requirements.

According to the invention a shaped solid material to be contacted with a flowing fluid is in the form of tubular units each having a perforated wall and having means to distance that wall from the wall of a cylindrical container in which they are to be stacked in axial relationship with one another and with the container.

The invention provides also such a container charged with such units, which are so distanced from the container walls as to afford a space for fluid flow in contact with the container walls.

The means to distance the container walls from the unit walls can be integral with the unit walls (in which event the unit is a new article) or can be provided by spacers around or stacked between units that need not themselves have integral distancing means.

The purpose of the perforations is to permit fluid flow in at least one direction transverse to the general direction of flow through the container. This is especially valuable when contact with the units involves absorption or evolution of heat, and thus the invention includes a heat exchange apparatus including such a charged container, especially a tube, and means for heat exchange through the container walls. Such an apparatus may exchange mainly sensible heat, as in gas heaters or coolers, but is especially useful when a chemical reaction with a substantial heat content change is involved, for example in a steam reforming furnace, an ammonia cracker and a heavy hydrocarbon cracker (all endothermic processes) and a methanator, ammonia synthesis reactor, methanol synthesis reactor, aromatisation reactor, ammonia/water absorber or ammonia/acid reactor (all exothermic processes). If such a reaction is to be catalysed, the units may provide catalytically active surfaces, as will be described.

The perforations in the unit walls typically amount to between 20 and 60% of the unit wall area. For many purposes, but especially a hydrocarbon steam reforming process at for example 10–60 bar abs pressure, the perforations are at least 1, preferably in the range 2–15, for example 2–5 mm wide in their smallest dimension.

Especially when, as is preferred, the units are made of metal or alloy, the perforations are the result of punching metal foil or sheet. Preferably each such punching leaves at least one internal or external vane attached to the unit wall; such vanes increase the geometric surface of the unit and can if suitably pitched ensure better contact of flowing fluid with the container walls and thus improved heat transfer.

The distancing means typically define, in cross-section, a circumscribed circle having a diameter between 1 and 30, especially between 5 and 20, % greater than that of the unit. If such means is integral with the unit, there are at least 3 projections, to ensure equidistance from container walls, and such projections may occur at least at or near both vertical extremities of the unit, to ensure co-axial stacking; alternatively the units may interlock, so that one extremity of each is located by the neighbouring unit; or only alternating units in a stack need be externally projectioned. In an extreme case the outer wall of each unit can be corrugated, that is, be formed with a close succession of projections.

If spacers are used, these can be for example other tubular units of greater diameter having internal projections on which the distanced units rest. Such other units may fit snugly or loosely in the container. Alternatively the spacers can be shorter tubular units or even essentially planar, for example, a toothed ring or non-slip washer.

The above-mentioned internal vanes, or possibly other internal projections, can also serve to distance the units from an internal heat exchange surface or from other units stacked inside them.

The units can, if desired, be linked together axially, for example in stacks of 2 to 100, to facilitate charging to a tubular container.

If the contact material units provide catalytically active surfaces, each is preferably made of high calcined ceramic such as alpha alumina or of metal or alloy; preferably it then carries a layer of catalyst secondary support material as hereinafter described. The invention provides a catalyst precursor in which the units carry a compound convertible to catalyst by reduction and/or sulphidation, directly or in the secondary support layer. Such a compound is typically of one or more metals from Groups Ib, VI, VII or VIII of the Periodic Table especially as described hereinafter. Yet further, the invention provides a catalyst comprising such units, preferably with the secondary support, and comprising such a reduction product (usually metal or lower oxide) and/or sulphidation product. If spacers are used, they also can be coated with such catalyst support and/or catalytic precursor or active material.

Especially when the unit has a very low adsorptive surface, for example when it is a metal or alloy, or an oxidic material having a pore volume less than 0.3, especially less than 0.1 $cm^3 g^{-1}$ and a surface area less than 10, especially less than 2 $m^2 g^{-1}$, the layer of secondary support material typically has a pore volume over 0.2 $cm^3 g^{-1}$ and a surface area of at least 1.0, preferably over 15, especially in the range 50–200 $m^2 g^{-1}$. The secondary support preferably has a thickness in the range 0.01 to 0.3, especially 0.02 to 0.1 mm.

The secondary support typically comprises alumina, especially gamma or eta alumina. Other sesquioxides, for example, chromia and rare earth oxides may take up at least part of the secondary support. Other useful secondary support oxides are titania, zirconia, hafnia, thoria, vanadia, urania, oxides or manganese, molybdenum and tungsten and combined oxides.

Preferably the secondary support includes a grain growth inhibitor, for example at least 0.05, especially 0.1 to 5.0% by weight of yttrium or of one or more rare earth oxides, especially of cerium, or praseodymium.

When nickel and/or cobalt are present in the catalyst, it is expected that the secondary support, if it contains a sesquioxide, will include, at least after a period of process operation, some nickel and/or cobalt spinel. It is within the invention to have the secondary support material at least partly in the form of spinel, whether of nickel and/or cobalt or of a divalent metal having a difficulty reducible oxide, especially magnesium or manganese or, less preferably, zinc. Since nickel and/or cobalt present as spinel is in a reduction-resistant oxidic form, it does not contribute significantly to the activity of the catalyst: active nickel and/or cobalt are additional thereto.

Alternatively the contact material can itself be a catalyst in virtue of the choice of material of construction or of chemical or physical modification of its surface for example by cold-rolling of a nickel-containing unit.

The heat exchange apparatus used as a steam reforming furnace comprises an insulated enclosure containing hot gas (usually combustion gases but possibly gas heated in a nuclear reactor), a plurality of tubes suspended within the enclosure, means to feed a mixture of hydrocarbon feedstock and steam and/or carbon dioxide to the tube inlets and to withdraw hydrogen-containing gas from the tube outlets and, within the tubes, a catalyst in the form of units according to the invention. The tubes can be of the single pass type, or of the double pass type in which each tube is blind at one end and products are withdrawn through an inner tube leading from the blind end to the inlet end.

Especially suitable steam reforming furnaces are described in our co-pending U.S. application Ser. No. 591,328 filed on Mar. 19, 1984 and corresponding to UK application No. 8308343 filed on Mar. 25, 1983.

The invention provides also chemical processes carried out in such apparatus or over such catalysts, in particular the "steam reforming" reaction of a hydrocarbon feedstock with steam and/or carbon dioxide to produce a gas containing at least 30% v/v of hydrogen on a dry basis is operated at 550°–1000° C. and at 1–60 bar abs pressure. In a typical process of this kind the geometric surface of the catalyst is well below the level of about 300 $m^{-1}$ common when using conventional ceramic ring catalyst, for example in the range 40–200 $m^{-1}$ and the pressure drop can be under 10% for example 0.1 to 2.0% that of such rings. Catalyst units to be used are for example 40–160 mm in diameter excluding external projections or spacers.

For such processes the hydrocarbon feedstock preferably has a boiling point not over 220° C. and is most conveniently normally gaseous, especially with a hydrogen mols to carbon atoms ratio of at least 2.5. Alternatively a hydrocarbon derivative is used, most conveniently methanol or ethanol.

The catalyst used in the process for reacting a hydrocarbon with steam and/or carbon dioxide comprises nickel and/or cobalt, preferably at a concentration in the range 30–60% w/w calculated as monoxide on the total of such metals and secondary support material. Optionally one or more platinum group metals, which are capable of increasing the activity of the nickel and/or cobalt and of decreasing the tendency to carbon lay-down when reacting hydrocarbons higher than methane, may be present. The concentration of such platinum group metal is typically in the range 0.005 to 1% as metal, calculated on the total of metals and secondary support material. Further, the catalyst can contain a platinum group metal but no non-noble catalyst component. Such a catalyst is more suitable than one on a conventional support because a greater fraction of the active metal is accessible to the reacting gas. A typical content of platinum group metal when used alone is in the range 0.005 to 5% w/w as metal, calculated in the same way.

The specific surface of the catalytic metal is suitably in the range 1 to 500 $m^2/g$ of coating. Within these ranges the larger areas are preferred for reactions under 600° C.

When both non-noble and noble metals are present a useful level of catalytic activity can be obtained using a notably small concentration of such metals, namely under 2%, especially 0.01 to 0.5, % w/w in all, calculated on the total of secondary support and such metals. The preferred noble metal is rhodium.

In such catalysts the secondary support is preferably as described hereinbefore and the units are made structurally of a heat resisting iron alloy, especially austenitic stainless steel containing 16–20% of chromium, 6–10% of nickel and constituents such as titanium or molybdenum or, more preferably 20–30% of chromium and 15–40% of nickel, in each case with minor constituents and balance iron. Ferritic steel containing 0.5 to 12% aluminium, 0.01 to 3.0% yttrium and possibly up to 25% chromium is also suitable.

The invention is illustrated by the accompanying drawings, in which

FIG. 1 respresents a unit according to the invention in position in a container which is a heat exchange tube;

FIG. 3b is an axial view of the unit shown in FIG. 3a.

DESCRIPTION OF PREFERRED EMBODIMENT

Figure 1:
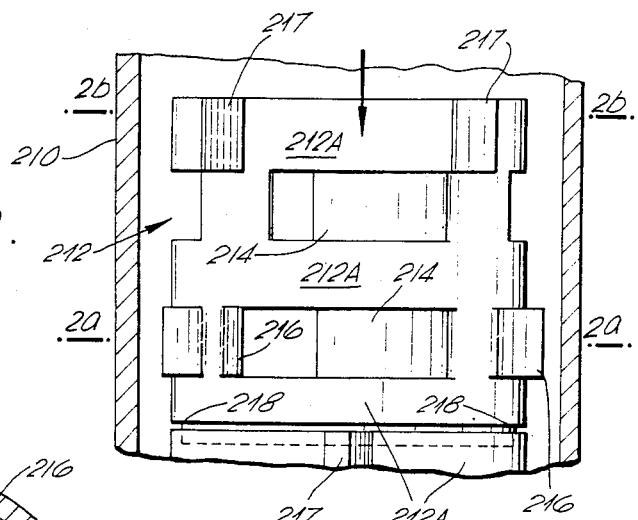
Figure 2A:
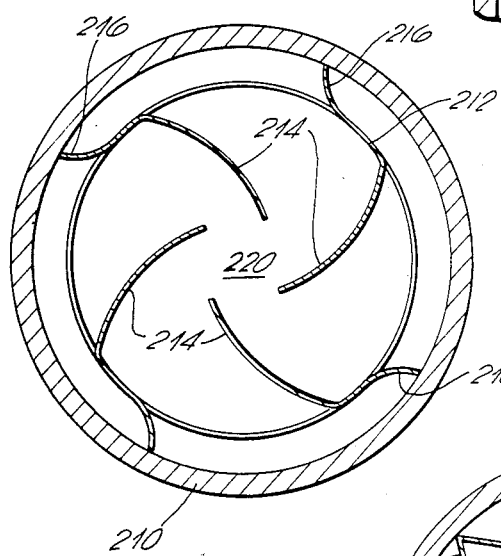
FIG. 2a is a section on line 2a—2a in FIG. 1.
Figure 2B:
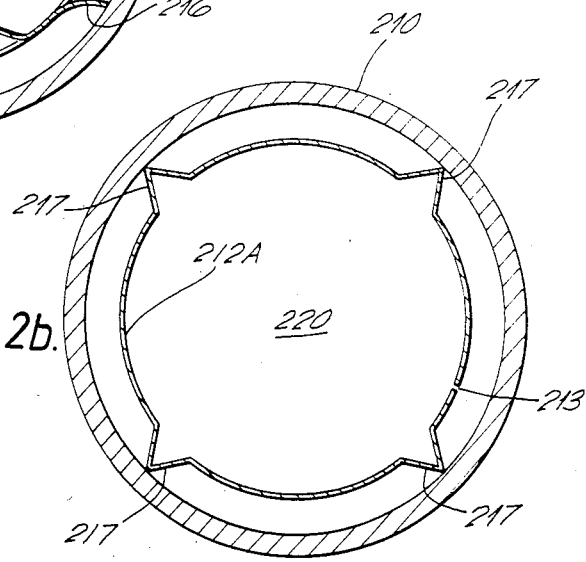
FIG. 2b is a section on line 2b—2b in FIG. 1.

In FIGS. 1 and 2a, 2b heat exchange tube wall 210 is for example a tube externally heated in a steam reforming furnace and the unit 212 is made of a stainless steel and carries a coating of alumina and metallic nickel. The unit includes solid portions 212A, which may at the top, bottom and center form a complete circle or may be split at 213, such that its shape is maintained by the resilience of the alloy. From the generally cylindrical walls of the unit vanes 214 project inwardly to provide an internal contact surface; and small tongues 216 (FIG. 2a) or ribs 217 (FIG. 2b) project outwardly to keep the unit walls at a separation from heat exchange tube wall 210. Vanes 214 and 216 are formed by stamping from the wall metal, and thus leave perforations in the walls. Ribs 217 are formed by pressing between toothed and grooved rollers during the shaping operation. Ribs 217 could be formed also on the middle or lower solid portions 212A or in the intervening portions. Alternatively or additionally one end of each unit can be necked at 218 to fit into the full-width end of the next unit above or beneath it, or succeeding units can be doubly-necked and of full width. The outer vanes and/or ribs of succeeding units need not be mutually aligned. The vanes and/or ribs can be pitched to set up a helical flow pattern in contact with the wall.

If desired, internal vanes 214 can meet or join in axial space 220. More usefully, space 220 can have a cross-sectional diameter 30–80% of that of unit 212 and can be occupied by a similar unit of such a diameter but of the same general shape as unit 212. In a very useful form of the invention, not shown FIGS. 1, 2a and 2b, but indicated in FIGS. 3a and 3b, space 220 can be occupied by a further heat exchange tube, and possibly the bottom of tube 210 can be blind, so that gas flowing down through tube 210 in contact with units 212 flows upwards through the axial tube. Upward flow followed by downward flow is equally possible.

The following further alternative combinations of units are envisaged:

(a) a unit as shown but without external projection 215 or 217 having above and beneath it a unit of greater diameter occupying more of the width of tube 210 or possibly fitting snugly as a result of compression of that unit to close gap 213. The smaller units in such a combination can at their ends lie within the larger units resting on vanes 214.

(b) units as shown but without external projections 216 or 217, each successive pair separated by a ring having at least 3 external projections and out-of-plane projections locating the units diametrally—for example a highly pitched non-slip washer.

Figure 3A:
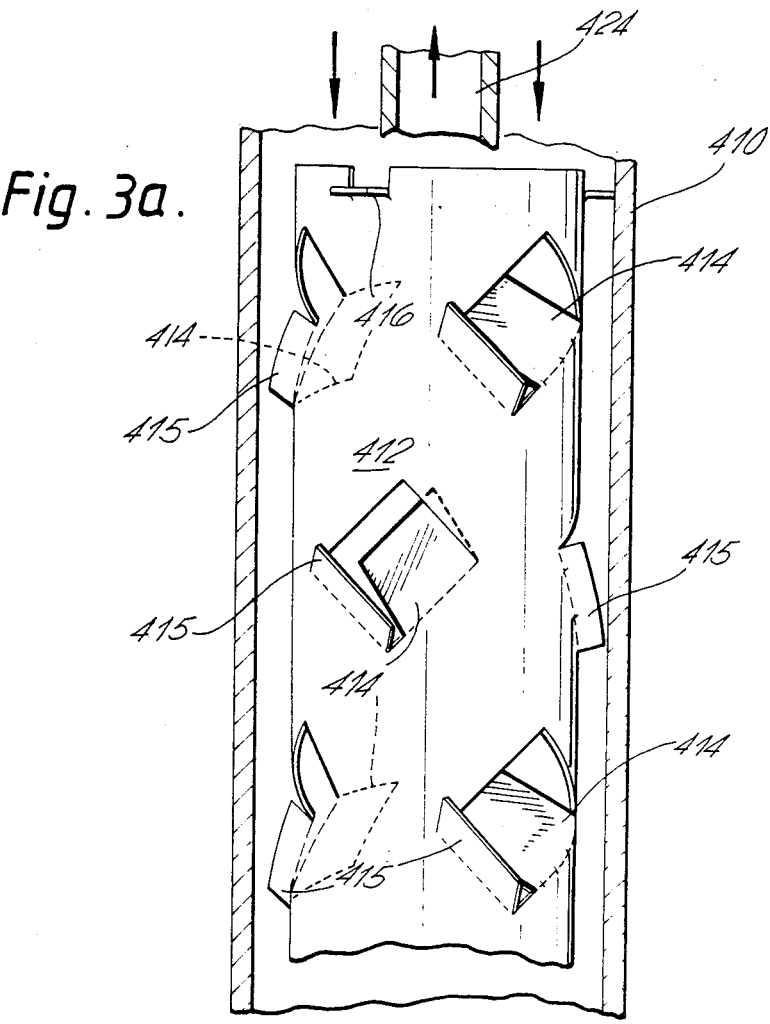
FIG. 3a is a side view of an alternative unit according to the invention.
Figure 3B:
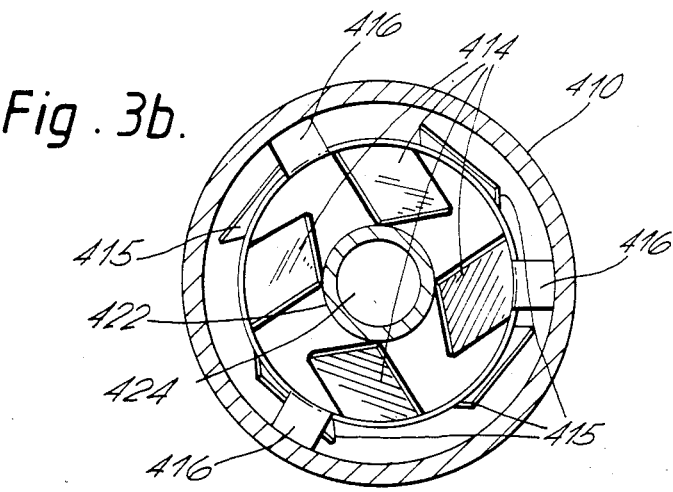

FIGS. 3a, b show an alternative unit in which internal and external pitched vanes have been formed. The outer heat exchange tube having wall 410 is blind at its lower end, and inner heat exchange tube suspended within it provides the outlet for the reactants. Unit 412, which can be a single unit equal in length to the heat exchange tubes or can be one of an assemblage as in FIG. 1 has inward vanes 414 (heavy outlines) but at an angle of 45° and outward vanes 415 punched from its walls and bent also at 45°, the root of the bend being indicated by the dotted lines. In the unit as shown vanes 414 direct the reactants outwardly, but equally the unit could be inverted to provide direction inwardly, or a single unit could carry both types of vane, or two types of unit could be stacked in alternation. Outward vanes 415 direct the reactants inwardly from the outer wall: they could extend outwardly far enough to contact the outer wall, but tongues 416 are provided for correct location of the unit.

When reactants pass through the unit they undergo endothermic reaction while in contact with it but at short intervals leave the surface and mix with reactant that has entered the unit by way of the perforations, having been reheated at wall 210, 410. In this way a high over-all rate of reaction is maintained. As the reactants pass downwardly their temperature gradually increases as a result of heat fed in from the furnace surrounding tube 210, 410 until sufficient conversion has taken place. If an axial tube such as 424 is present, the hot converted reactants flowing upwardly through it give up heat to the reactants flowing downwardly over units 212, 412 in the annular space between the tubes.

In experimental trials in standard methane steam reforming conditions as described in our co-pending U.S. application Ser. No. 447134, catalyst units as described in the figures, made of stainless steel and carrying a coating of alumina (5% w/w) and metallic nickel (50% w/w of the coating) showed activity of the same order as that of commercial catalyst, but at a much lower drop.

I claim:

1. Apparatus for contacting a flowing fluid with a solid surface comprising:
   container means defining a hollow cylindrical container having an interior cylindrical surface and including an inlet and an outlet establishing therebetween a flow path for the fluid; and
   at least one open-ended tubular unit having a cylindrical wall establishing an interior space, said at least one tubular unit being coaxially positioned in said container means in spaced relation to said interior cylindrical surface of said container means so that said cylindrical wall establishes an annular space with said interior cylindrical surface, said at least one tubular unit including:
   (1) plural vane means each having (a) one end attached to said cylindrical wall, (b) another end extended into one of said interior and annular spaces, and (c) a contact surface between said one and another ends against which the fluid contacts as the fluid flows along said flow path, each said vane means thereby defining respective perforations in said cylindrical wall for establishing fluid communication between said interior and annular spaces; and
   (2) locating means including plural deformed portions in said cylindrical wall which extend into said annular space and which are in contact with said interior cylindrical surface for coaxially locating said at least one unit within said container means in said spaced relation to said interior cylindrical surface so as to maintain said annular space.

2. Apparatus as in claim 1 wherein said locating means is provided by predetermined ones of said vane means.

3. Apparatus according to claim 1 wherein the area of said perforations amounts to between 20 and 60% of the area of said cylindrical wall.

4. Apparatus according to claim 1 wherein said interior cylindrical surface of the container has a diameter between 5 and 20% greater than the diameter of said cylindrical wall.

5. Apparatus according to claim 1 wherein at least some of said plural vane means extend inwardly of said cylindrical wall into said interior space.

6. Apparatus according to claim 1 wherein at least some of said vane means extend outwardly of said cylindrical wall into said annular space, at least some of said outwardly extending vane means locating said unit with its cylindrical wall in spaced coaxial relationship with the cylindrical interior surface of said container means.

7. Apparatus according to claim 5 wherein at least some of said vane means include an inward vane extending inwardly into said interior space and an outward vane extending outwardly into said annular space.

8. Apparatus according to claim 1 wherein at least some of said vane means are pitched for imparting a helical flow pattern to fluid flowing through said container means along said flow path.

9. Apparatus according to claim 7, wherein said vane means which include said inward and outward vanes define a perforation of rectangular configuration and wherein the inward vane is adjacently positioned relative to said outward vane.

10. Apparatus according to claim 9, wherein said rectangular perforation has sides disposed at an angle of 45° relative to a longitudinal axis of said at least one unit.

11. Apparatus according to claim 1 further comprising a tube coaxial with said container means and extending through the interior of said at least one unit.

12. Apparatus according to claim 1 wherein said at least one unit carries a layer of catalyst secondary support material.

13. Apparatus according to claim 12 in which the support material layer includes a compound of one or more metals from Groups Ib, VI, VII or VIII of the Periodic Table convertible to catalyst by reduction and/or sulphidation.

14. Apparatus according to claim 12 suitable for use in the reaction of a hydrocarbon with steam and/or carbon dioxide to produce a hydrogen-containing gas wherein said secondary support contains metallic nickel and/or cobalt at a concentration in the range 30–60% calculated as monoxide on the total of such metals and said secondary support.

15. A steam reforming furnace comprising an insulated enclosure for containing hot gas, a plurality of tubes suspended within the enclosure, means to feed a mixture of hydrocarbon feedstock and steam and/or carbon dioxide to the tube inlets and to withdraw hydrogen-containing gas from the tube outlets, wherein each of said tubes includes:

container means defining a hollow cylindrical container having an interior cylindrical surface and including an inlet and an outlet establishing therebetween a flow path for the fluid; and at least one open-ended tubular unit having a cylindrical wall establishing an interior space, said at least one tubular unit being coaxially positioned in said container means in space relation to said interior cylindrical surface of said container means so that said cylindrical wall establishes an annular space with said interior cylindrical surface, said at least one tubular unit including:

(1) plural vane means each having (a) one end attached to said cylindrical wall, (b) another end extended into one of said interior and annular spaces, and (c) a contact surface between said one and another ends against which the fluid contacts as the fluid flows along said flow path, each said vane means thereby defining respective perforations in said cylindrical wall for establishing fluid communication between said interior and annular spaces; and (2) locating means including plural deformed portions in said cylindrical wall which extend into said annular space and which are in contact with said interior cylindrical surface for coaxially locating said at least one unit within said container means in said spaced relation to said interior cylindrical surface so as to maintain said annular space, and wherein said at least one unit carries a layer of catalyst secondary support material including a compound of at least one metal selected from groups Ib, VI, VII, or VIII of the Periodic Table convertible to catalyst by reduction and/or sulphidation.

\* \* \* \* \*